United States Patent [19]
Booth et al.

[11] Patent Number: 5,642,927
[45] Date of Patent: Jul. 1, 1997

[54] LCD PROJECTOR WITH RETRACTABLE PROJECTION LENS ASSEMBLY

[75] Inventors: David K. Booth, Tigard; Arlie R. Conner, Tualatin, both of Oreg.

[73] Assignee: Lightware, Inc., Beaverton, Oreg.

[21] Appl. No.: 567,174

[22] Filed: Nov. 22, 1995

[51] Int. Cl.⁶ .................................................. G03B 21/14
[52] U.S. Cl. ............................................. 353/119; 353/101
[58] Field of Search ..................................... 353/119, 101, 353/100

[56] References Cited

U.S. PATENT DOCUMENTS

| | | | |
|---|---|---|---|
| 2,859,660 | 11/1958 | Lucas | 353/DIG. 3 |
| 5,090,800 | 2/1992 | Ushiro | 353/119 |
| 5,400,095 | 3/1995 | Minich et al. | 353/122 |
| 5,416,541 | 5/1995 | Fog | 353/119 |
| 5,453,803 | 9/1995 | Shapiro et al. | 353/119 |

*Primary Examiner*—William Dowling
*Attorney, Agent, or Firm*—Marger, Johnson, McCollom & Stolowitz, P.C.

[57] ABSTRACT

The present invention includes a LCD projector having a light source for directing light through a LCD and a projection lens assembly toward a display screen to form a display image. The light source and the LCD being encased within a main projector housing. The projection lens assembly being supported and carried by a retractable carrier between operating and stowage positions. In a preferred embodiment, the retractable carrier positions the projection lens assembly in its operating position outside the main body housing.

33 Claims, 6 Drawing Sheets

LCD PROJECTOR WITH RETRACTABLE PROJECTION LENS ASSEMBLY

FIELD OF THE INVENTION

The present invention relates to liquid crystal display projectors and, in particular, to such a projector with a retractable projection lens assembly.

BACKGROUND OF THE INVENTION

Image display projectors generate display images and project them onto display screens, typically for viewing by multiple persons or viewers. In a front-projection format, for example, the projector is positioned on the same side of the display screen as the viewers. The projector directs the display image to the display screen from which the image is reflected for viewing.

FIG. 1 is a diagrammatic side view of a prior art liquid crystal display (LCD) projector 10 having a light source 12 and a reflector 14 that direct polychromatic, substantially white light through a condenser lens 16 along optical paths 18 toward a fold mirror 20.

The light passes through a collimating Fresnel lens 22 that collimates the light for delivery to a LCD 24 such as, for example, a transmissive color thin-film transistor (TFT) active matrix LCD. LCD 24 controls or modulates the substantially white light to form a multi- or full-color display object according to a video display signal delivered to LCD 24 from display control circuitry (not shown). The video display signal may be in the form of, for example, a computer display signal that is generated in real time or retrieved from a computer memory.

The light modulated by the LCD 24 propagates to a Fresnel field lens 26 that focuses the light toward an objective projection lens assembly 28, which projects the light toward a display screen 30. Proper alignment of the optical components in LCD projector 10 is necessary to obtain display images on display screen 30 with minimal aberrations or distortions. Accordingly, optical components such as LCD 24, Fresnel lenses 22 and 26, and projection lens 28 are typically mounted in fixed positions to maintain proper alignment.

A consequence of assembling the LCD projector in such a manner is that the practicable optical design constraints require that at least minimum distances be maintained between selected optical components. For example, LCD 24 with a conventional diagonal dimension of 8.4 inches (21.3 cm) would typically be used with Fresnel field lens 26 of the same diagonal dimension and a focal length of at least about 10 inches (25.4 cm), which corresponds to the minimum path length distance between Fresnel field lens 26 and projection lens assembly 28. Collimating Fresnel lens 22 typically would have a focal length of at least about 9 inches (22.9 cm) and a corresponding separation from light source 12 of about 8 inches (20.3 cm). Conventional LCD projector 10 must encompass within its housing, therefore, a fixed minimum optical path length of at least about 18 inches (45.7 cm).

In addition to the fixed minimum optical path length, conventional LCD projector 10 includes a generally planar LCD 24 that is oriented substantially perpendicular to the optical path and generates optical information to be projected with minimal aberrations or distortions. As a result, a conventional LCD projector housing typically has width and height dimensions comparable to the planar dimensions of LCD 24 and a length dimension comparable to the conventional minimum focal lengths.

A disadvantage of such a conventional LCD projector housing is that it defines a volume that may be approximated as 2.8× (diagonal dimension of LCD 24)$^3$, or about 1800 in$^3$ (29,500 cm$^3$), in the stated example, which is relatively large as an item to be carried by an individual. More specifically, LCD projectors frequently are used as portable presentation tools, and such relatively large LCD projector housings are cumbersome and difficult to handle, particularly when traveling. Moreover, the mechanical components required for such a relatively large optical instrument must be correspondingly large and increase the weight and cost of conventional LCD projectors.

In some conventional LCD projectors, the size of the housing is decreased by employing at least one fold mirror, such as fold mirror 20, that folds the optical path between fixed optically active or powered components such as LCD 24, lenses 22 and 26, and projection lens assembly 28. Such fold mirrors function to utilize more efficiently the volume within the LCD projector housing for the optical path lengths between the fixed optically active or powered components. U.S. Pat. No. 5,321,450 of Shapiro et al. shows an example of an LCD projector with multiple fold mirrors between fixed optically active or powered components. The LCD projector of Shapiro et al. includes two fold mirrors positioned between an illumination source and the LCD, two fold mirrors positioned between the LCD and a projection lens assembly, and a projection fold mirror that projects a display image toward a display screen. As with other conventional LCD projectors, all of the optical paths between the illumination source and the projection lens assembly is contained within the LCD projector housing. In this case, the volume is reduced to about 2.2× (diagonal dimension of LCD)$^3$, or about 1300 in$^3$ (21,300 cm$^3$) Moreover, each of the five fold mirrors transmits only 94 percent of incident light, resulting in a brightness reduction of 28 percent. With image brightness consistently being a limitation in LCD projector performance, such a significant loss of luminance is a major disadvantage of using large numbers of fold mirrors to fit the optical path compactly within an LCD projector housing.

SUMMARY OF THE INVENTION

An object of the present invention is, therefore, to provide a LCD projector with a reduced housing size that is convenient for an individual to handle.

Another object of this invention is to provide such a LCD projector that has reduced weight and is convenient for an individual to transport.

A further object of this invention is to provide such a LCD projector that selectively positions at least one optically active or powered components outside a main projector housing.

Yet another object of this invention is to provide such a LCD projector with a retractable carrier for positioning selectively at least one optically active or powered component with sufficient accuracy, stability, and repeatability that projection images are formed without discernible distortion or aberrations.

The present invention includes a LCD projector having a light source for directing light through a LCD and a projection lens assembly toward a display screen to form a display image. The light source and the LCD are encased within a main projector housing and operate with collimating and field lenses in the same manner as a conventional LCD projector. In accordance with this invention, the projection lens assembly is supported and carried by a retractable carrier between operating and stowed positions.

In a preferred embodiment, the retractable carrier positions the projection lens assembly in its operating position outside the main body housing and includes a pair of carrier panels that are pivotally coupled together to form an A-frame configuration. One of the carrier panels is pivotally coupled to the main body housing and carries within its interior a fold mirror that receives light from the LCD and directs the light toward the projection lens assembly. The other of the carrier panels supports the projection lens assembly and includes a pair of opposed tracking rollers or pins that extend from opposite sides of the carrier panel into a matched pair of tracks.

The retractable carrier positions the fold mirror and the projection lens assembly in operating positions with sufficient accuracy, stability, and repeatability that projection lens assembly is aligned with the LCD and field lens to form projection images without discernible distortion or aberrations. With the retractable carrier in the operating position outside the main body housing, the LCD projector of this invention accommodates the optical path length requirements of the optical components.

The retractable carrier positions the fold mirror and the projection lens assembly in stowed positions that are substantially inside or along the main body housing of the LCD projector. With retractable carrier in the stowed position substantially inside the main body housing, the LCD projector reduces by up to about 50 percent the post-LCD optical path length that must be fixed therein. As a result, a LCD projector of this invention is capable of being carried or transported with a main body housing having up to about 40 percent less volume and 50 percent less weight than conventional LCD projectors.

Conventional optical design considerations emphasize that the optically powered or active components of LCD projectors have fixed positions to prevent distortion or aberrations of the resulting display images. Avoidance of display distortions and aberrations is major design consideration for LCD projectors. The relatively large distances at which LCD projectors project the display image will typically exaggerate even minor misalignments between optically powered or active components. The fixed positions of such components frequently are considered to be necessary and have resulted in conventional LCD projectors being excessively large and cumbersome.

With reference to the conventional LCD projector described in U.S. Pat. No. 5,321,450 of Shapiro et al., for example, the LCD and projection lens assembly are fixed relative to each other. A projection mirror receives light from the projection lens assembly and directs the light toward a display screen. The projection mirror is not, however, an optically powered or active component. The alignment of the projection mirror generally does not affect display distortions or aberrations, except that the LCD projector of Shapiro et al. purportedly eliminates keystone distortion if light passes through the LCD and is reflected from the projection mirror at identical angles relative to normal axis planes of the LCD and the display screen, respectively.

The foregoing and other features and advantages of preferred embodiments of the present invention will be more readily apparent from the following detailed description which proceeds with reference to the accompanying drawings.

DETAILED DESCRIPTION OF PREFERRED EMBODIMENT

Figure 2:
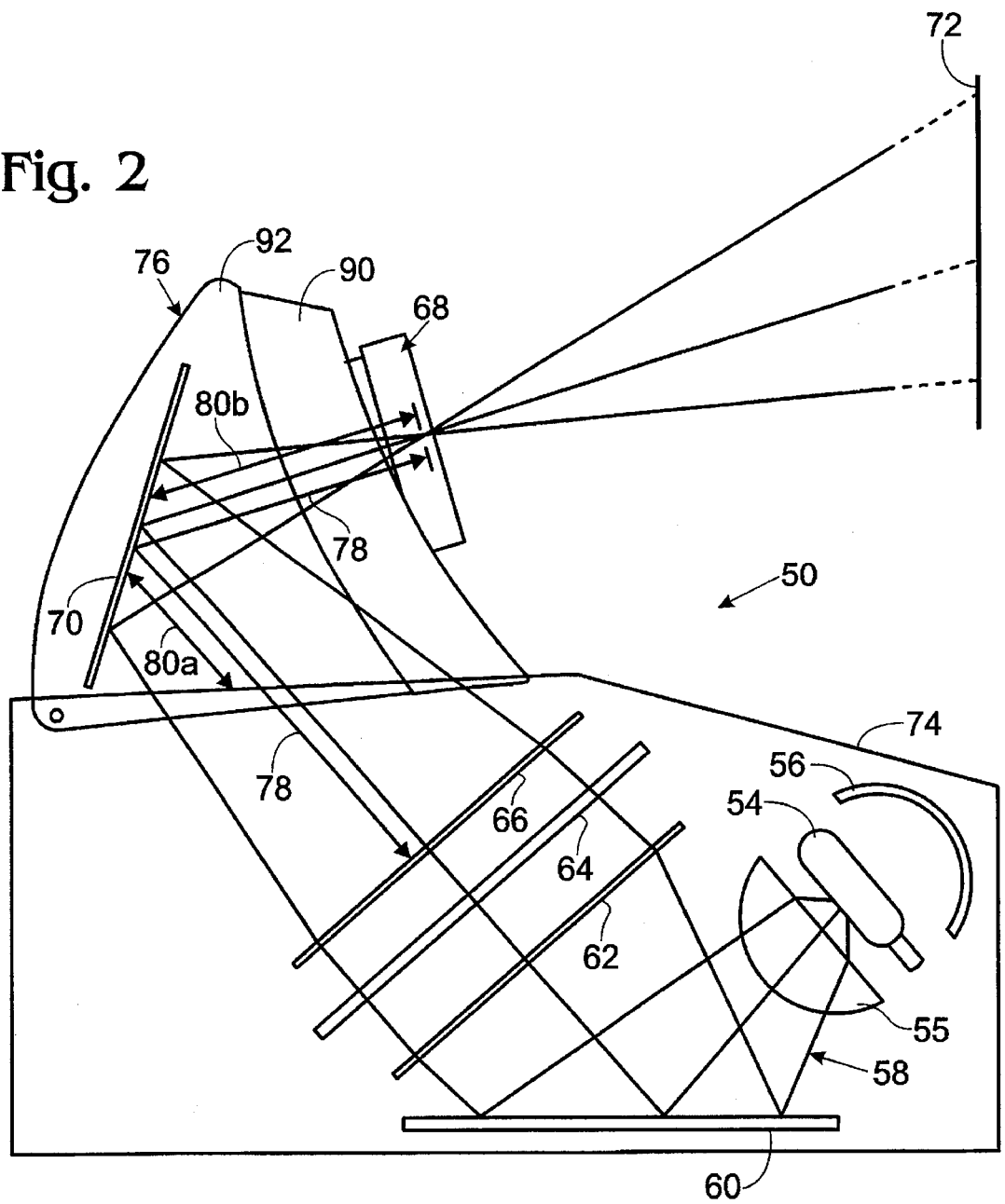
FIG. 2 is a schematic side view optical diagram of a LCD projector of the present invention with a retractable carrier for carrying a projection lens assembly positioned in an operating position.

FIG. 2 is a diagrammatic side view of a liquid crystal display (LCD) projector 50 of the present invention having a light source 54 positioned between a condenser lens 55 and a reflector 56 to direct polychromatic, substantially white light along optical paths 58 toward a first fold mirror 60. Preferably, fold mirror 60 is of the "cold" type and substantially transmits infrared radiation so it is not reflected.

The light passes through a collimating lens 62 (e.g., of the Fresnel type) that collimates the light for delivery to a LCD 64 such as, for example, a transmissive color thin-film transistor (TFT) active matrix LCD. LCD 64 controls or modulates the substantially white light to form a multi- or full-color display object according to a video display signal delivered to LCD 64 from display control circuitry (not shown). The video display signal may be in the form of, for example, a computer display signal that is generated in real-time or retrieved from a computer memory.

The light modulated by the LCD 64 propagates to a field lens 66 (e.g., of the Fresnel type) that focuses the light toward an objective projection lens assembly 68. A second fold mirror 70 receives the light from field lens 66 and directs the light toward projection lens assembly 68, which projects the light toward a display screen 72 for viewing.

A main projector housing 74 encases the successive optical components between and including reflector 56 and field lens 66. In accordance with the present invention, projection lens assembly 68 and second fold mirror 70 are carried by a retractable carrier 76 that selectively positions projection lens assembly 68 and second fold mirror 70 in an operating position outside main projector housing 74 or a stowed position substantially inside or along main projector housing 74.

Field lens 66 in the form of a generally conventional Fresnel lens preferably has a focal length 78 that is matched to the focal length of projection lens assembly 68 and is proportional to the diagonal measure of LCD 64 by a factor of 1.0 to 3.0, preferably 1.2 to 1.5. Proper operation of LCD projector 50 requires that projector lens assembly 68 be positioned apart from field lens 66 by an optical distance about equal to focal length 78. Retractable carrier 76 and second fold mirror 70 provide path lengths 80a and 80b outside main projector housing 74 between field lens 66 and projection lens assembly 68. Path lengths 80a and 80b provide more than about 50 percent of focal length 78 outside main projector housing 74, thereby allowing it to have a significantly reduced size and weight.

Figure 3:
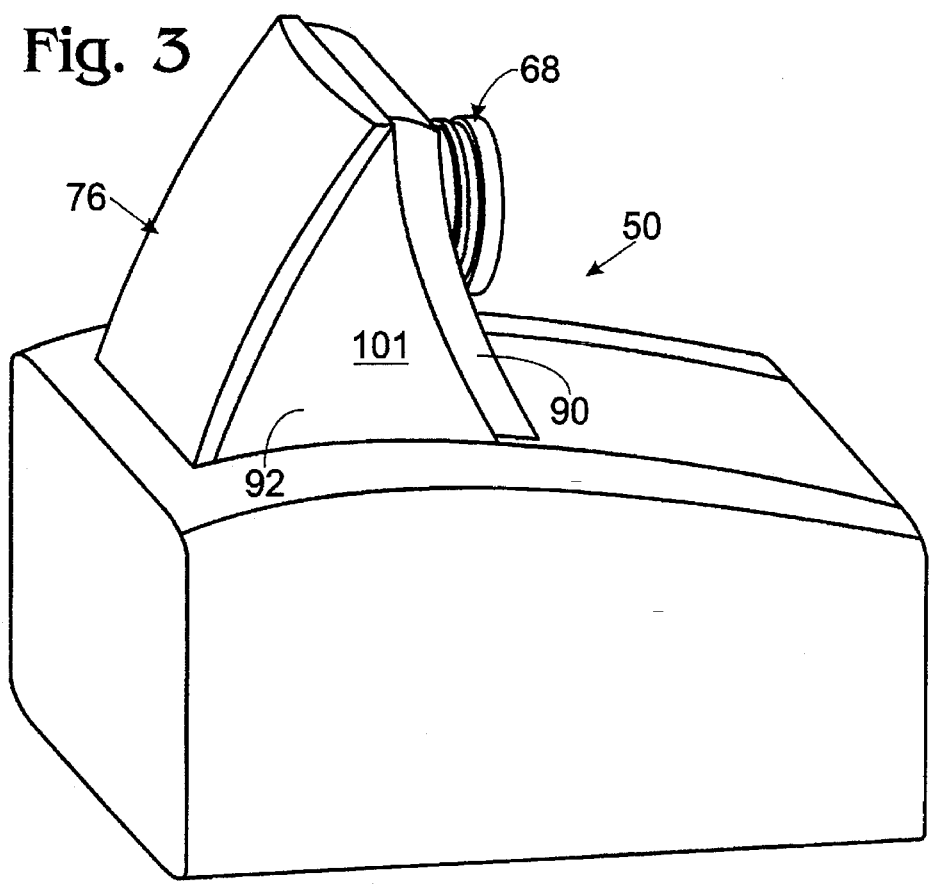
FIG. 3 is an isometric side view of the LCD projector of FIG. 2.

FIG. 3 is an isometric side view of LCD projector 50 showing retractable carrier 76 with projection lens assembly 68 extended from main projector housing 74 in an operating position. Referring also to FIGS. 6A–6D, retractable carrier 76 includes a pair of carrier components or panels 90 and 92 that are pivotally coupled together along a hinge 94 and carry projection lens assembly 68 and fold mirror 70 (not shown), respectively.

Carrier panel 92 is pivotally coupled to main projector housing 74 by a hinge 96. Carrier panel 90 includes a pair of opposed tracking rollers or pins 98 only one shown) that extend from opposite sides of carrier panel 90. Tracking pins 98 slide or roll within a matched pair of tracks 100 (only one shown schematically). The pivotal motion of hinges 94 and 96 cooperates with the travel of pins 98 along tracks 100 to fold carrier 76 about hinge 94 and simultaneously retract carrier 76 and projection lens assembly 68 into main projector housing 74. Alternatively, carrier 76 may be positioned with a rack and pinion gear assembly, preferably with a drive motor, or other manual or motor-driven mechanical control mechanisms, as are well known.

Carrier panel 92 includes a pair of side walls 101 (only one shown) between which carrier panel 90 fits. Retractable carrier 76 in its extended position preferably forms, therefore, a substantially closed encasement for enclosing projection lens assembly 68 and fold mirror 70. The enclosure blocks extraneous or ambient light from entering projection lens assembly 68, protects the interior of LCD projector 50 and its components from extraneous objects, protects users from potential injury by the operation of carrier 76 or LCD projector 50, and minimizes the dust and other particulates that accumulate on fold mirror 70 and interior surfaces of projection lens assembly 68.

Figure 4:
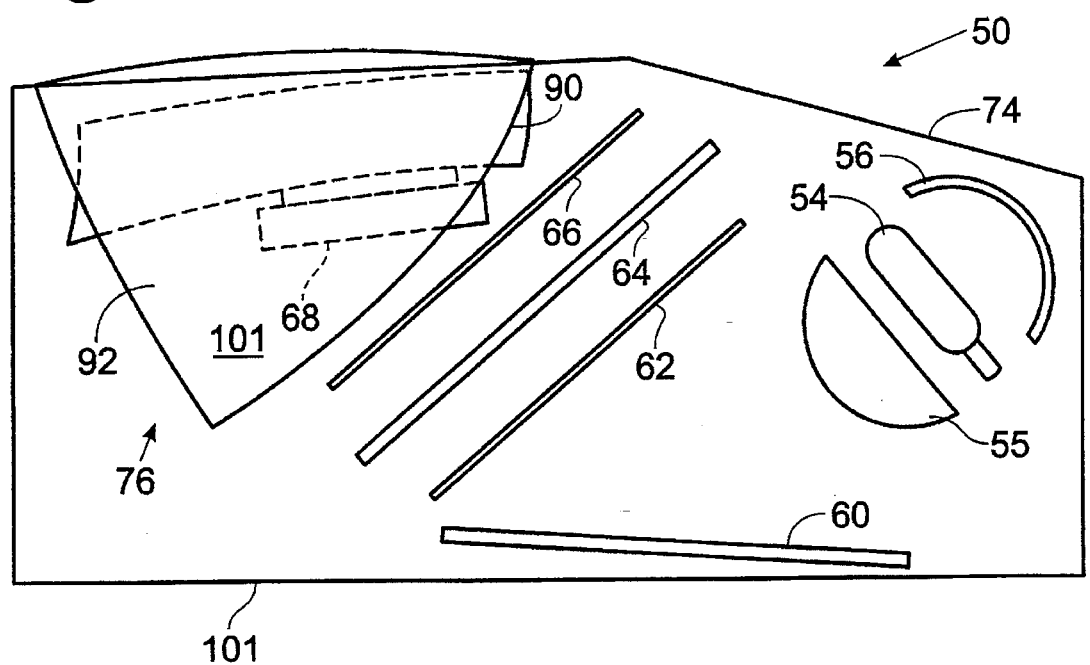
FIG. 4 is a diagrammatic side view of the LCD projector of FIG. 2 with the projection lens assembly carrier retracted into a stowed position.
Figure 5:
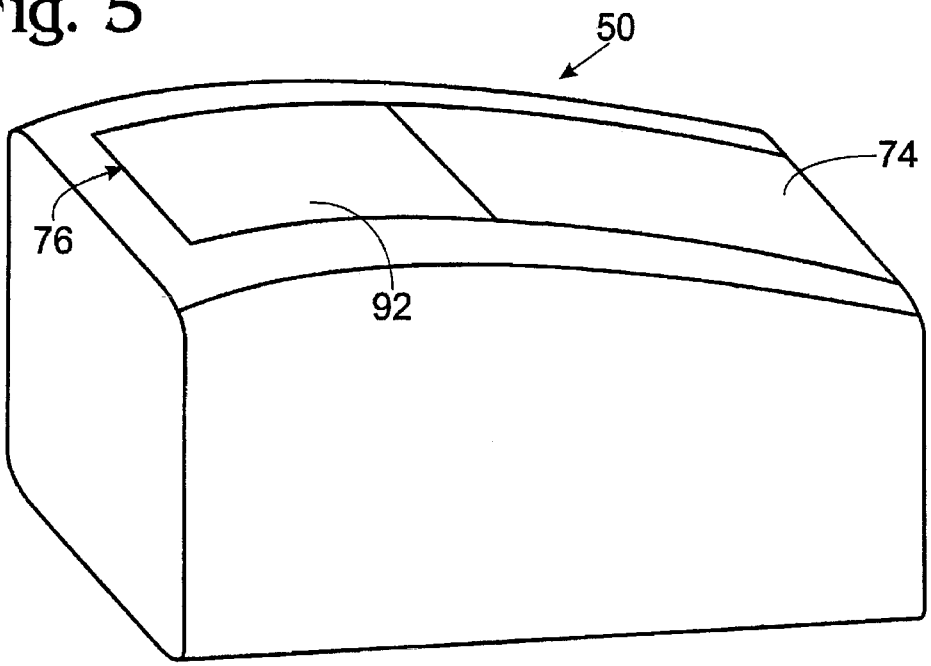
FIG. 5 is an isometric side view of the LCD projector of FIG. 4.

Retractable carrier 76 positions projection lens assembly 68 and fold mirror 70 in operating positions with sufficient accuracy, stability, and repeatability that LCD projector 50 can form projected display images without discernible distortion or aberrations. An aspect of this invention is the realization that projection lens assembly 68 can be extended from main projector housing 74 with positioning that is sufficiently precise to avoid causing unacceptable distortion or aberrations in projected display images. FIGS. 4 and 5 are respective diagrammatic and isometric side views of LCD projector 50 showing retractable carrier 76 retracted into a stowed position. Referring to FIG. 4, retractable carrier 76 extends into and positions projection lens assembly 68 within main projector housing 74. Preferably, projection lens assembly 68 in its stowed position extends into a volume in main projector housing 74 that, during normal operation of LCD projector 50, is open for the propagation of light from field lens 66.

A benefit of the retractability of retractable carrier 76 is that the size, and therefore weight, of LCD projector 50 may be minimized. In particular, conventional LCD projectors include housings with relatively large volumes that enclose the significant transverse dimensions of a LCD and the required optical path lengths. In contrast, LCD projector 50 extends projection lens assembly 68 from main projector housing 74 for display operation, but stows projection lens assembly 68 within an otherwise open volume within main projector housing 74.

Figure 1:
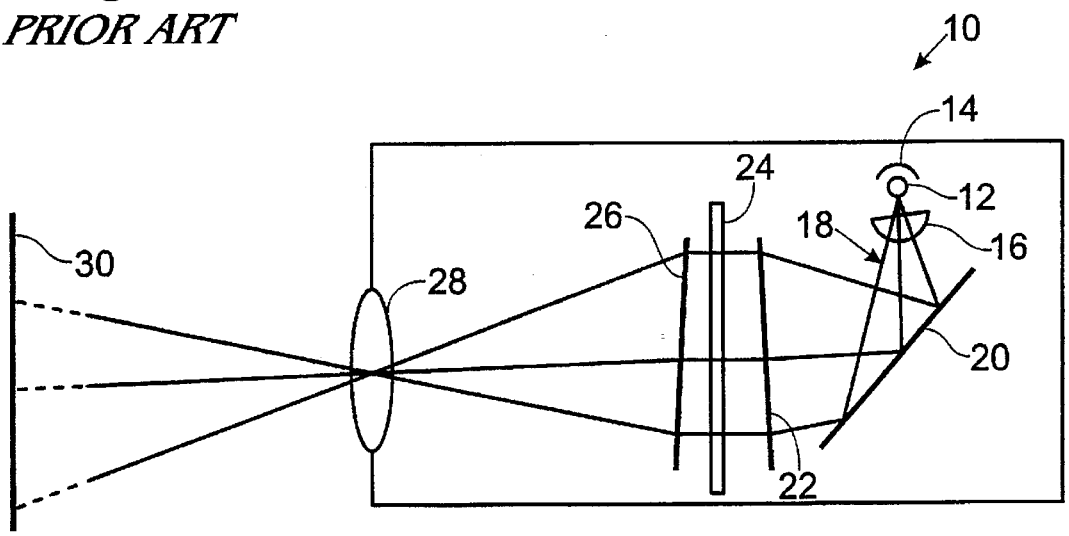
FIG. 1 is a schematic side view optical diagram of a prior art LCD projector.

Another benefit of LCD projector 50 is that projection lens assembly 68 in its operating position is elevated from a bottom surface 101 (FIG. 4) of main projection housing 74 by approximately 6 inches (15 cm) more than a projection lens assembly 28 in the conventional LCD projector 10 of FIG. 1. For common projection elevation angles, projection lens assembly 68 with its increased elevation inherently positions a display image on display screen 72 at a correspondingly greater height than that at which conventional projection lens 28 of projector 10 positions a display image on display screen 30. To provide common display image heights at a typical projection distance of 6 feet (1.8 m), conventional LCD projector 10 would require a projection elevation angle of 10.7° in comparison to a projection elevation angle of 6° for LCD projector 50. As is known in the art, increased projection elevation angles typically cause keystone image distortion.

FIGS. 6A–6D are side elevation views of retractable carrier 76 at different successive positions or orientations from the operating position to the stowed position, respectively. It will be appreciated that the views of retractable carrier 76 in FIGS. 6A–6D are exemplary of the continuous motion of carrier between the positions of FIGS. 6A and 6D.

Figure 6A:
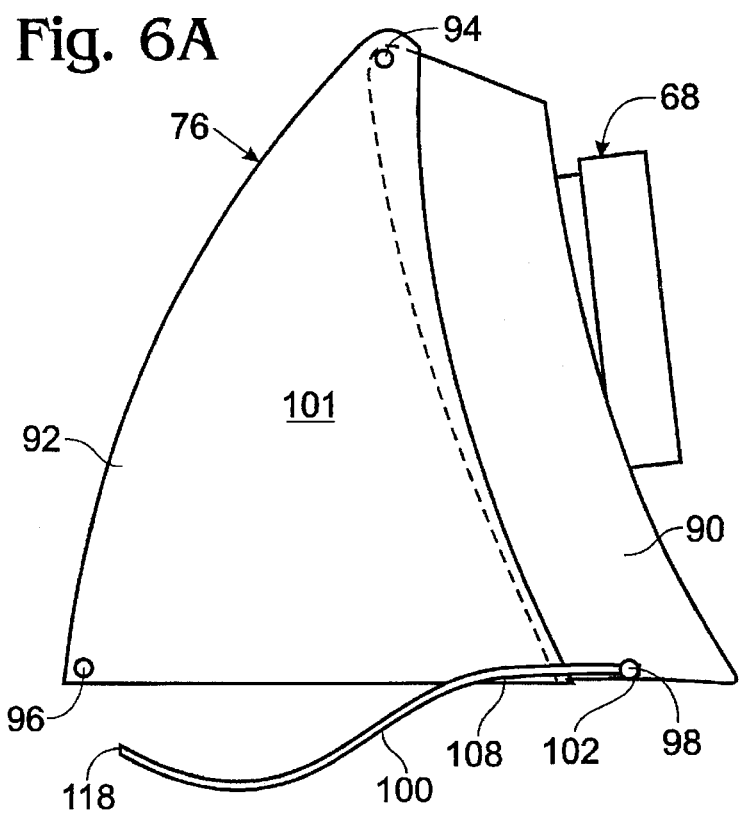
FIGS. 6A–6D are side elevation views of the retractable carrier of FIG. 2 at different successive positions or orientations from the operating position to the stowed position, respectively.

FIG. 6A schematically shows retractable carrier 76 in its extended position orienting projection lens assembly 68 to receive light from fold mirror 70 (FIG. 2) and direct the light toward display screen 72. Preferably, pins 98 in the extended position of FIG. 6A are pressed under compression by springs or catches against ends 102 (only one shown) or other stops of tracks 100.

Carrier panels 90 and 92 in this extended position form an extremely stable and repeatable A-frame configuration for supporting projection lens assembly 68 and fold mirror 70. As a result, retractable carrier 76 is capable of positioning projection lens assembly 68 and fold mirror 70 with sufficient accuracy to eliminate perceptible image deformations or aberrations.

Figure 6B:
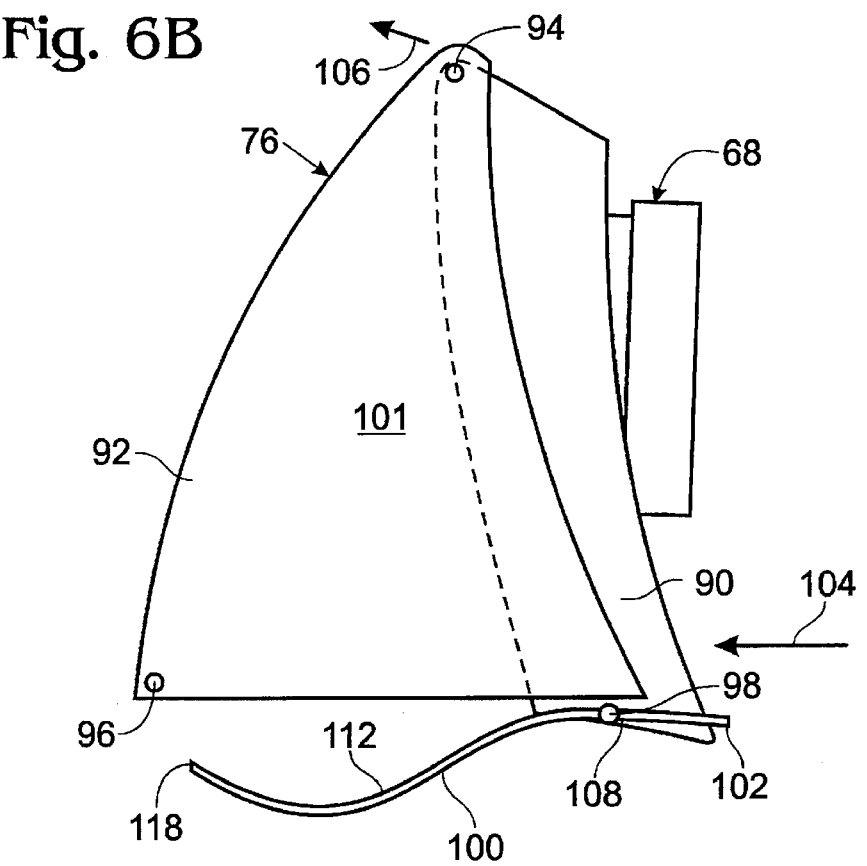

FIG. 6B schematically shows retractable carrier 76 in a first partly retracted position with pins 98 approximately at transition points 108 (only one shown) of tracks 100. Arrow 104 indicates the approximate direction of movement of pins 98 and attached end of carrier panel 90 from the extended position of FIG. 6A and the first partly retracted position. Arrow 106 indicates the approximate direction of movement of hinge 94 caused by pivotal motion of carrier panel 92 about hinge 96.

Tracks 100 are generally straight between ends 102 and transition points 108, and pins 98 traveling between ends 102 and transition points 108 primarily function to partly fold carrier panel 90 into carrier panel 92. As a result, the first partly retracted position of FIG. 6B corresponds to the A-frame configuration of the extended position of FIG. 6A being collapsed to allow retractable carrier 76 to be further retracted into main projector housing 74.

Figure 6C:
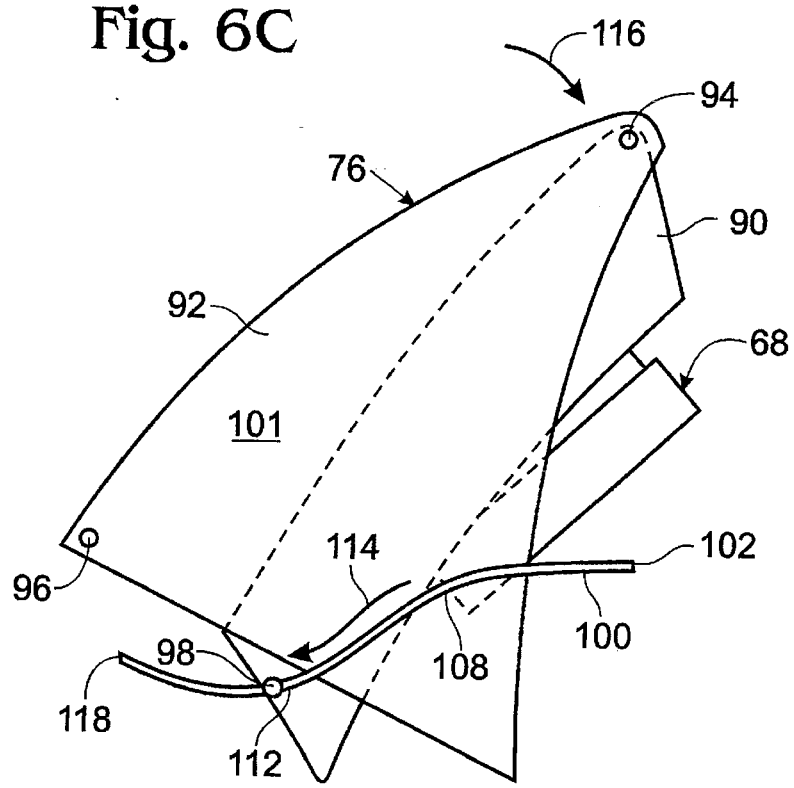

FIG. 6C schematically shows retractable carrier 76 in a second partly retracted position with pins 98 approximately at transition points 112 (only one shown) of tracks 100. Tracks 100 are generally concave relative to carrier 76 between transition points 108 and retracted end points 114 (only one shown). Pins 98 traveling between transition points 108 and 112 function further to fold carrier panel 90 into carrier panel 92 while it is retracted into main projector housing 74. Arrow 114 indicates the approximate direction of pins 98. Arrow 116 indicates the approximate direction of movement of hinge 94.

Figure 6D:
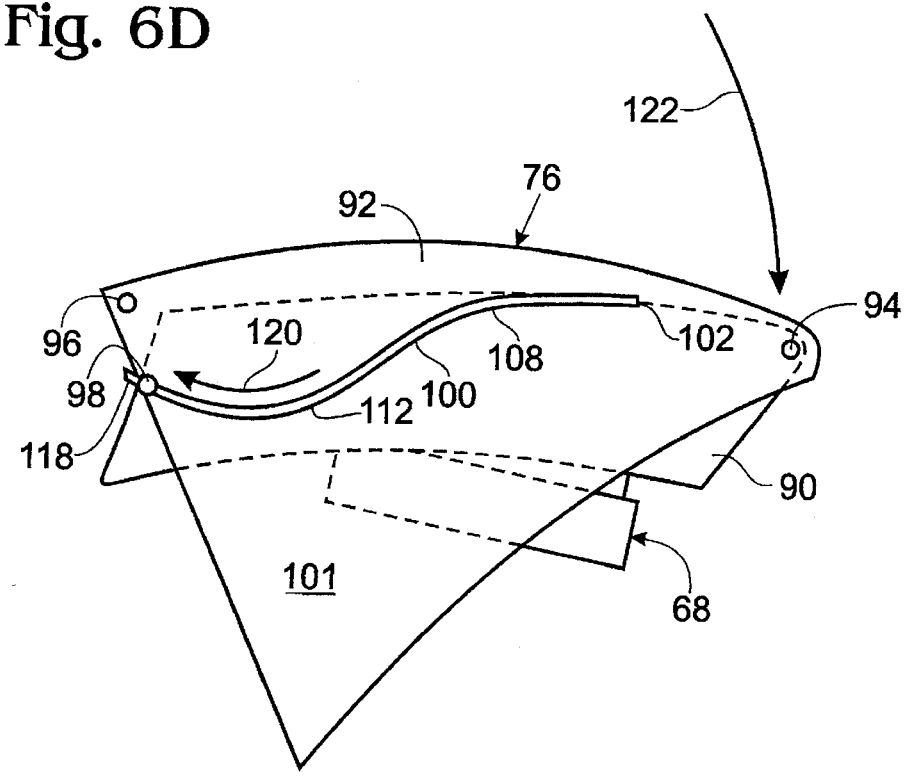

FIG. 6D schematically shows retractable carrier 76 in a fully retracted position with pins 98 approximately at retracted end points 118 of tracks 100. Pins 98 traveling between transition points 112 and retracted end points 118 function to fold carrier panel 90 compactly into carrier panel 92 while it is retracted completely into main projector housing 74. Arrows 120 and 122 indicate the approximate directions of movement of pins 98 and hinge 94, respectively.

Folding carrier panel 90 compactly into carrier panel 92 minimizes the volume within main projector housing required for carrier panel 90 and projection lens assembly 76 according to a preferred embodiment of this invention. It will be appreciated, however, that retractability of retractable carrier 76 into main projector housing 74 may be accomplished along a variety of different tracking paths or mechanisms.

It will be appreciated that the benefits of the present invention may be obtained with retractable carriers of a variety of configurations other than that of retractable carrier 76. FIGS. 7A–7E are schematic side views of an alternative retractable carrier 130 with a pair of carrier panels 132 and 134 that support and carry a projection lens assembly 136 and a fold mirror 138, respectively.

FIGS. 7A–7E show retractable carrier 130 at different successive positions or orientations from an operating position to a stowed position, respectively. Retractable carrier 130 may be substituted for retractable carrier 76 in LCD projector 50. Accordingly, projection lens assembly 136 and fold mirror 138 would be the same as projection lens assembly 68 and fold mirror 70. It will be appreciated that the views of retractable carrier 130 in FIGS. 7A–7E are exemplary of the continuous motion of carrier between the positions of FIGS. 7A and 7E.

Figure 7A:
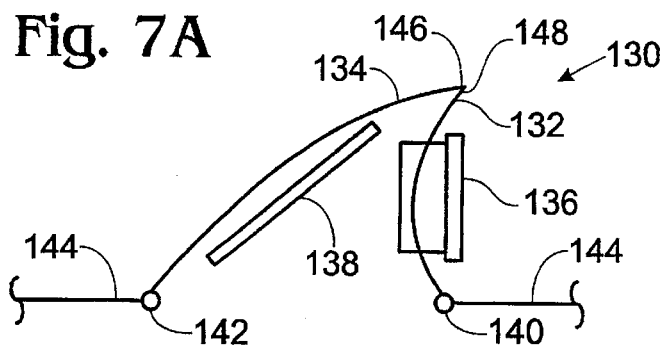
FIGS. 7A–7E are schematic side views of an alternative retractable carrier.

FIG. 7A schematically shows retractable carrier 130 in its extended position orienting projection lens assembly 136 to receive light from fold mirror 138 and direct the light toward a display screen. Carrier panels 132 and 134 are pivotally coupled at opposed ends by respective hinges 140 and 142 to a main projector housing 144. In the operating position of FIG. 7A, facing ends 146 and 148 of respective carrier panels 132 and 134 are engaged or interlocked to hold them in a stable and repeatable A-frame configuration. As a result, retractable carrier 130 is capable of positioning projection lens assembly 136 and fold mirror 138 with sufficient accuracy to eliminate perceptible image deformations or aberrations.

Figure 7B:
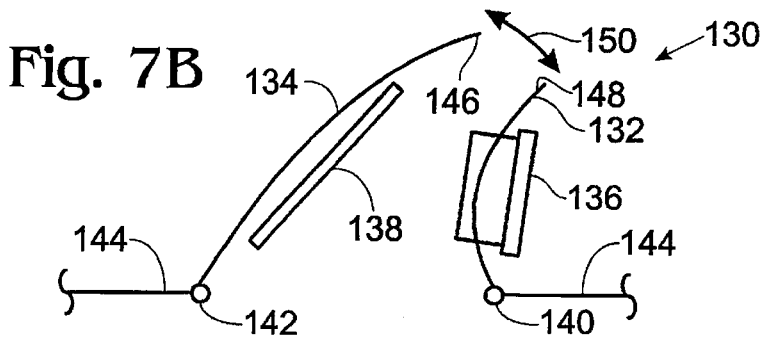

FIG. 7B schematically shows retractable carrier 130 in an intermediate position for retraction in which facing ends 146 and 148 of respective carrier panels 132 and 134 are disengaged. Arrows 150 indicates the approximate directions of movement of facing ends 146 and 148.

Figure 7C:
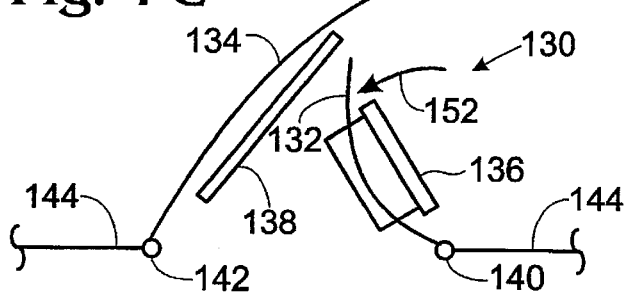
Figure 7D:
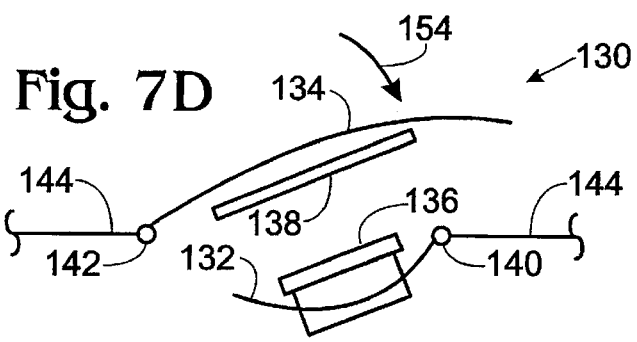
Figure 7E:
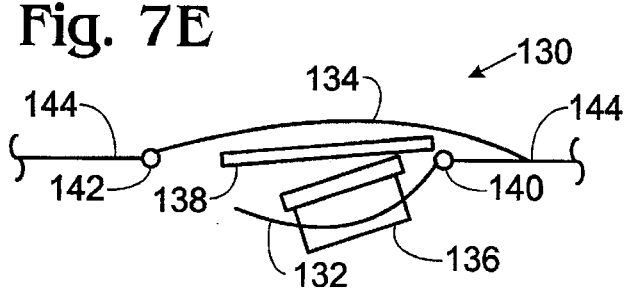

FIGS. 7C and 7D schematically show retractable carrier 130 in successive partly retracted positions with, respectively, carrier panels 132 and 134 pivoted toward an interior of main projector housing 144. Arrows 152 and 154 indicate the approximate directions of movement of carrier panels 132 and 134. Generally, carrier panels 132 and 134 are pivoted separately into main projector housing 144. FIG. 7E schematically shows carrier 130 retracted into main projector housing 144. As shown in FIGS. 7A–7E, projection lens assembly 136 rotates through an angle of at least about 60 degrees between its operating and stowed positions.

The A-frame configurations of retractable carriers 76 and 130 provide stable and repeatable positioning of projection lens assemblies, as well as highly compactable carrier structures. While such compactability is preferred, it will be appreciated that the benefits of this invention are available with retractable carrier structures of configurations other than A-frame configurations. As examples, retractable carriers according to this invention could alternatively have configurations that generally are tubular, cubical, hemi-cylindrical, or that employ brackets of arbitrary configuration. Moreover, retractable carriers according to this invention could employ linear motion or pivotal motion about axes with orientations different than the orientations of the axes about which retractable carriers 76 and 130 pivotally move.

Having illustrated and described the principles of the present invention in a preferred embodiment, it should be apparent to those skilled in the art that the embodiment can be modified in arrangement and detail without departing from such principles. Accordingly, we claim as our invention all such embodiments as come within the scope and spirit of the following claims and equivalents thereto.

We claim:

1. A liquid crystal display (LCD) projector comprising:
    an LCD panel;
    a projection lens assembly through which light is directed toward a display screen to form a display image, the light passing through the projection lens assembly in a projection direction;
    a retractable carrier for carrying the projection lens assembly between operating and stowed positions in respective first and second directions transverse to the projection direction, the projection lens assembly in the operating position being functional to receive light from the LCD and direct the light toward the display screen;
    the retractable carrier including first and second carrier components that are coupled together for carrying the projection lens assembly; and
    a fold mirror carded by the second carrier component to receive light from the LCD and direct the light through the projection lens assembly.

2. The LCD projector of claim 1 in which the light source and the LCD panel are encased within a main projector housing and the retractable carrier positions the projection lens assembly in its operating position outside the main projector housing.

3. The LCD projector of claim 1 in which the projection lens assembly is supported by the first carrier component.

4. The LCD projector of claim 1 wherein the light source and the LCD panel are encased within a main projector housing, in which the retractable carrier is arranged to position the projection lens assembly in its stowed position inside the main projector housing.

5. The LCD projector of claim 1 wherein the retractable carrier includes first and second carrier components that are pivotally coupled together by a hinge.

6. The LCD projector of claim 5 in which the second carrier component is pivotally coupled to the first carrier component at one end and the first carrier component includes at an opposed end a pin that fits within and travels along a track.

7. The LCD projector of claim 6 in which the track is configured to guide the pin toward the second carrier component when the lens assembly is moved from an operating position to a stowed position.

8. The LCD projector of claim 7 in which the track is shaped in a shallow-S configuration.

9. The LCD projector of claim 8 wherein the first and second components that are pivotally coupled together by a first hinge, the first carrier component supporting the projection lens assembly and the second carrier component being pivotally coupled relative to the main body housing by a second hinge.

10. A liquid crystal display (LCD) projector comprising:
an LCD panel;
a main projector housing encasing the light source and LCD panel;
a projection lens assembly through which light received from the light source through the LCD panel is directed toward a display screen to form a display image, the light passing through the projection lens assembly in a projection direction;
a retractable carrier for carrying the projection lens assembly between operating and stowed positions in respective first and second directions transverse to the projection direction, the projection lens assembly in the operating position being functional to receive light from the LCD and direct the light toward the display screen, wherein the retractable carrier is arranged to position the projection lens assembly in its operating position outside the main projector housing;
the retractable carrier including first and second carrier components that are coupled together for carrying the projection lens assembly; and
the first and second carrier components forming an A-frame configuration when positioning the projection lens assembly in its operating position outside the main projector housing.

11. The LCD projector of claim 10 further comprising a fold mirror that is carded by the second carrier component to receive light from the LCD and direct the light through the projection lens assembly when in its operating position.

12. A liquid crystal display (LCD) projector comprising;
an LCD panel;
a main projector housing encasing the light source and LCD panel;
a projection lens assembly through which light received from the light source through the LCD panel is directed toward a display screen to form a display image, the light passing through the projection lens assembly in a projection direction; and
a retractable carrier for carrying the projection lens assembly between operating and stowed positions in respective first and second directions transverse to the projection direction the projection lens assembly in the operating position being functional to receive light from the LCD and direct the light toward the display screen, wherein the retractable carrier positions the projection lens assembly in its operating position outside the main projector housing;
the retractable carrier first and second carrier components that are pivotally coupled together by a first hinge, the first carrier component supporting the projection lens assembly and the second carrier component being pivotally coupled relative to the main body housing by a second hinge.

13. The LCD projector of claim 12 in which the second carrier component is pivotally coupled to the first carrier component at one end and the first component includes at an opposite end a pin that fits within and travels along a track.

14. The LCD projector of claim 12 further comprising a fold mirror that is carried by the second carrier component to receive light from the LCD and direct the light through the projection lens assembly.

15. A liquid crystal display (LCD) projector comprising:
a light source;
an LCD panel;
a projection lens assembly through which light is directed toward a display screen to form a display image, the light passing through the projection lens assembly in a projection direction; and
a retractable carrier for carrying the projection lens assembly between operating and stowed positions, the light source and the LCD being encased within a main projector housing and the retractable carrier being arranged to position the projection lens assembly in its operating position outside the main projector housing;
wherein the retractable carrier includes first and second carrier components that are pivotally coupled together by a first hinge, the first carrier component supporting the projection lens assembly and the second carrier component being pivotally coupled relative to the main body housing by a second hinge.

16. The LCD projector of claim 15 in which the retractable carrier positions the projection lens assembly in its stowed position inside the main projector housing.

17. The LCD projector of claim 15 in which the second carrier component is pivotally coupled to the first carrier component at one end and includes at an opposed end a pin that fits within and travels along a track.

18. The LCD projector of claim 15 further comprising a fold mirror that is carried by the second carrier component to receive light from the LCD and direct the light through the projection lens assembly.

19. The LCD projector of claim 17 in which the track is contoured to guide the lens assembly between operating and stowed positions.

20. A liquid crystal display (LCD) projector comprising:
a light source;
an LCD panel;
a projection lens assembly through which light is directed toward a display screen to form a display image, the light passing through the projection lens assembly in a projection direction;
a retractable carrier for carrying the projection lens assembly between operating and stowed positions, the light source and the LCD being encased within a main projector housing and the retractable carrier extending the projection lens assembly in its operating position above the main projector housing;
wherein the retractable carrier includes first and second carrier components that are coupled together for carrying the projection lens assembly; and
the first and second carrier components forming an A-frame configuration when positioning the projection lens assembly in its operating position above the main projector housing.

21. A liquid crystal display (LCD) projector comprising:
a light source;
an LCD panel;
a projection lens assembly through which light is directed toward a display screen to form a display image the light passing through the projection lens assembly in a projection direction;
a retractable carrier for carrying the projection lens assembly between operating and stowed positions, the light source and the LCD being encased within a main projector housing and the retractable carrier extending the projection lens assembly in its operating position above the main projector housing; and
a fold mirror in close association with the projection lens assembly and in which the retractable carrier includes first and second carrier components that are coupled together and each carry one of the projection lens assembly and the fold mirror.

22. The LCD projector of claim 21 in which the second carrier component is pivotally coupled to the first carrier component at one end and the first component includes at an opposite end a pin that fits within and travels along a track.

23. The LCD projector of claim 22 in which the track is contoured to guide the lens assembly between operating and stowed positions.

24. The LCD projector of claim 23 in which the track is shaped in a shallow-S configuration to thereby guide the pin toward the second carrier component when the lens assembly is moved from operating to stowed positions, the first and second carrier component pivoting inward relative to each other and downward into the housing to a stowed position so that the first and second carrier components are in nested relationship with each other.

25. An LCD projector system, comprising:
a housing including a front wall, a back wall, and a top wall spanning between said front wall and said back wall, wherein said front wall, back wall and top wall define an approximately rectangular space, said top wall having an opening defined therethrough adjacent said back wall;
a light source positioned within the housing nearer said front wall than said rear wall;
a liquid crystal display (LCD) panel disposed diagonally within the housing between the light source and the top wall opening, said LCD panel, back wall and top wall bounding a substantially triangular space within a rear portion the housing;
a lens assembly positionable in an operable position above said top opening to receive and transmit light from the LCD panel in a forward direction above the top wall; and
a hinge pivotally connecting the lens assembly to the top wall so that said lens assembly can be swung downward through the top opening to a non-operative position within said triangular space in the housing.

26. The LCD projector system of claim 25, further including a fan mounted adjacent a lower corner to the housing adjacent the rear wall in position to blow cooling air across the LCD panel.

27. The LCD projector system of claim 25, wherein the hinge is mounted adjacent a top corner at the back wall of the housing.

28. The LCD projector system of claim 25, including optics means for guiding light from said light source rearward within the housing, through said LCD panel and out through said top wall opening.

29. A projector system, comprising:
a housing including a front wall, a back wall, and a top wall spanning between said front wall and said back wall, said top wall having an opening defined therethrough adjacent said back wall;
a light source disposed within the housing;
a projection lens assembly positionable over the opening; and
a carrier positioned over said top wall having first and second carrier components which are coupled together, said first carrier component supporting the projection lens assembly and the second carrier component being pivotally coupled to the top wall to fold downward in substantially flush abutment with the top wall and over the opening.

30. The projector system of claim 29, wherein the second carrier component is pivotally coupled to the first carrier component at one end and the first component includes at an opposite end a pin that fits within and travels along a track as the second carrier component is being folded downward.

31. The projector system of claim 30, further comprising a fold mirror that is carried by the second carrier component to receive light from the light source and direct the light through the projection lens assembly.

32. The projector system of claim 30, the track having a first curved portion which acts to pivot the first carrier component toward the second carrier when the pin is moved therealong, and a second curved portion which acts to pivot the first carrier component downward toward the opening.

33. The projector system of claim 30 wherein the first and second carrier component form a substantially enclosed assembly over the opening which prevents dust from entering the housing through the opening.

* * * * *